United States Patent
Chae et al.

(10) Patent No.: US 8,120,626 B2
(45) Date of Patent: *Feb. 21, 2012

(54) FLEXIBLE DISPLAY DEVICE AND METHOD FOR CHANGING DISPLAY AREA

(75) Inventors: Ho Yeon Chae, Seoul (KR); Chang Soo Ryu, Seoul (KR)

(73) Assignee: Pantech Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/814,262

(22) Filed: Jun. 11, 2010

(65) Prior Publication Data

US 2010/0245392 A1    Sep. 30, 2010

Related U.S. Application Data

(63) Continuation of application No. 11/453,433, filed on Jun. 14, 2006, now Pat. No. 7,755,647.

(30) Foreign Application Priority Data

Jun. 28, 2005    (KR) .................. 10-2005-0056173

(51) Int. Cl.
*G09G 5/00*    (2006.01)
(52) U.S. Cl. ........................... 345/659; 345/667
(58) Field of Classification Search .................. 345/656, 345/659, 667
See application file for complete search history.

(56) References Cited

U.S. PATENT DOCUMENTS

| | | | |
|---|---|---|---|
| 6,956,589 B2 | 10/2005 | Lipsky et al. | |
| 7,755,647 B2 * | 7/2010 | Chae et al. | 345/659 |
| 2005/0046710 A1 | 3/2005 | Miyazaki | |
| 2006/0176278 A1 | 8/2006 | Mathews et al. | |

FOREIGN PATENT DOCUMENTS

| | | |
|---|---|---|
| KR | 10-2002-0078338 | 10/2002 |
| KR | 2003-0080508 | 10/2003 |

OTHER PUBLICATIONS

Notice of Allowance dated Mar. 3, 2010 in U.S. Appl. No. 11/453,433.
Non-Final Office Action dated Sep. 3, 2009 in U.S. Appl. No. 11/453,433.
Advisory Action dated Jun. 29, 2009 in U.S. Appl. No. 11/453,433.
Final Office Action dated Mar. 27, 2009 in U.S. Appl. No. 11/453,433.
Non-Final Office Action dated Oct. 22, 2008 in U.S. Appl. No. 11/453,433.

* cited by examiner

*Primary Examiner* — Jeffery A Brier
(74) *Attorney, Agent, or Firm* — H.C. Park & Associates, PLC

(57) ABSTRACT

A display device to change an image displayed in a display area when the display area is changed includes a memory, a location output unit and a screen display unit. The memory stores size information of a display area displayed on a screen and the image data of the displayed image. The location computing unit computes a start point of the changed display area when the display area is changed. The display unit decodes data corresponding to the size of the display area based on the computed new start point from the image data to display the decoded data in the display area. Since the start point is obtained with center point of the changed display area and its size information and then a display area to be displayed is determined based on the start point, a current search location is maintained even when the screen is swung.

17 Claims, 7 Drawing Sheets

FLEXIBLE DISPLAY DEVICE AND METHOD FOR CHANGING DISPLAY AREA

CROSS REFERENCE TO RELATED APPLICATIONS

This application is a continuation of U.S. patent application Ser. No. 11/453,433, filed on Jun. 14, 2006 and claims priority from and the benefit of Korean patent application No. 10-2005-0056173, filed on Jun. 28, 2005, which are both hereby incorporated by reference for all purposes as if fully set forth herein.

BACKGROUND OF THE INVENTION

1. Field of the Invention

The present disclosure generally relates to a display device and a display method, and more specifically, to a device and method of computing a start point of a display area with a center point of the display area and the size information of the screen to determine the display area based on the start point so that current search information can be maintained even when the screen is swung.

2. Description of the Related Art

Recently, a mobile communication terminal has been used as a multimedia device to perform various functions including to play MP3, take a photograph, store and edit a photographed image as well as to call a person up. When a user watches an image (photograph) which is larger than the screen and stored in the mobile communication terminal on the screen of the terminal, if the full size of the image is displayed on the screen, the image becomes smaller so that the user cannot recognize the contents precisely. In this case, a user enlarges a desired part from the entire image with a detailed enlargement search function. As shown in FIG. 1, a user moves a display area on the actual size of the image with up, down, left and right directional keys to search a desired area. The mobile communication terminal displays location information on the currently displayed area from the entire image on the right bottom of the screen.

Recently, a swing phone (for example, mobile phone SCH-V600 produced by Samsung Electronics) has been widely used whose screen is rotated by 90° so that the length and width of the screen are exchanged with each other. However, a conventional swing phone initializes current search information when the screen is 90° swung while a user searches an image. That is, when a user swings a screen by 90° while searching a specific area, a displayed area on the screen after swing is not a displayed area before swing but an initialized area. As a result, a user has to search the corresponding area again when the user tries to watch the previously searching area again.

SUMMARY OF THE INVENTION

Various embodiments of the present invention are directed at providing a display is device configured to maintain current search information as it is regardless of change of a screen (change of the aspect ratio) during detailed search of an image.

According to one embodiment of the present invention, a flexible display device depending on change of a display area comprises a memory, a location computing unit and a display unit. The memory is configured to store size information of a display area on a screen and the entire image data of the displayed image. The location computing unit is configured to compute a start point of the changed display area when the display area is changed. The display unit is configured to decode data corresponding to the size of the display area based on the start point form the entire image data and display the decoded data.

According to one embodiment of the present invention, a flexible display method depending on change of a display area comprises a first step of computing a start point of a changed display area from the entire image when a display area is changed; and a second step of displaying an area corresponding to the size of the changed display area based on the start point from the entire image.

BRIEF DESCRIPTION OF THE DRAWINGS

Other aspects and advantages of the present invention will become apparent upon reading the following detailed description and upon reference to the drawings in which.

DETAILED DESCRIPTION OF THE EXEMPLARY EMBODIMENTS

The present invention will be described in detail with reference to the accompanying drawings. Wherever possible, the same reference numbers will be used throughout the drawings to refer to the same or like parts.

Figure 2:
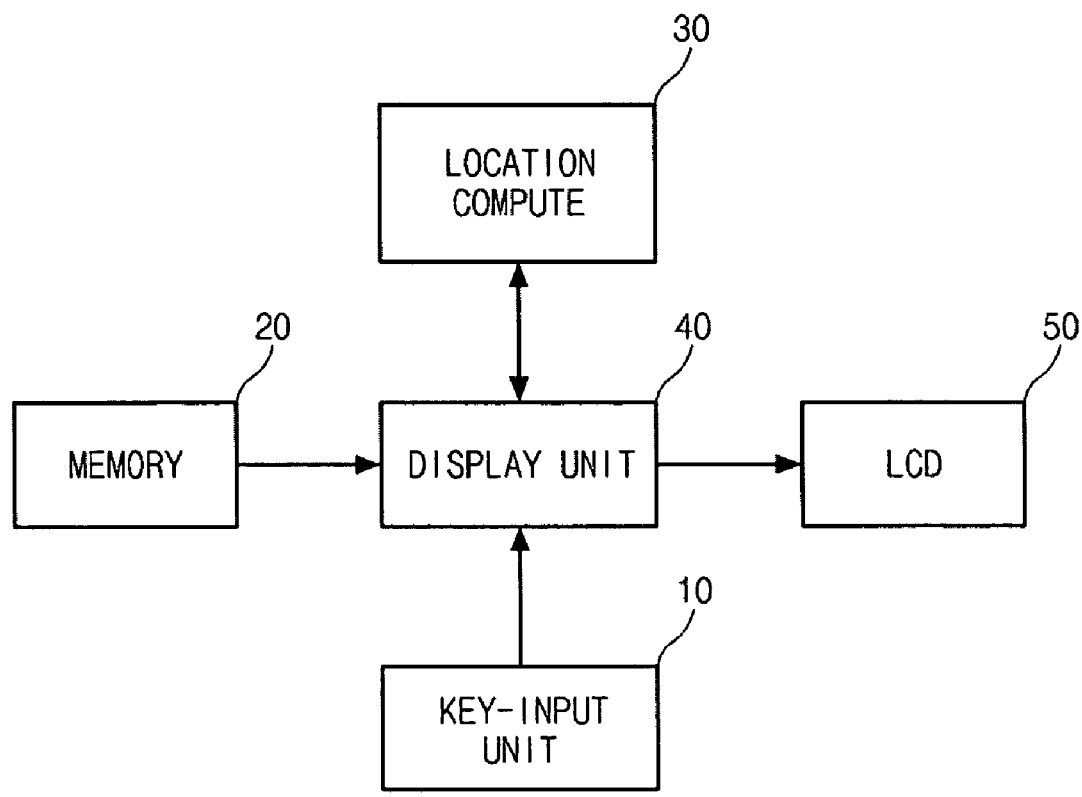
FIG. 2 is a diagram illustrating a flexible display device depending on change of a display area according to an embodiment of the present invention.

FIG. 2 is a diagram illustrating a flexible display device depending on change of a display area according to an embodiment of the present invention.

Referring to FIG. 2, the display device comprises a key-input unit 10, a memory 20, a location computing unit 30 and a display unit 40.

The key-input unit 10 comprises a plurality of data input keys and directional keys (→←↑↓) as a user interface unit to the display device. A user searches a desired area with the directional keys of the key input unit 10 in detailed search by enlarging an image stored in the display device.

Figure 3:
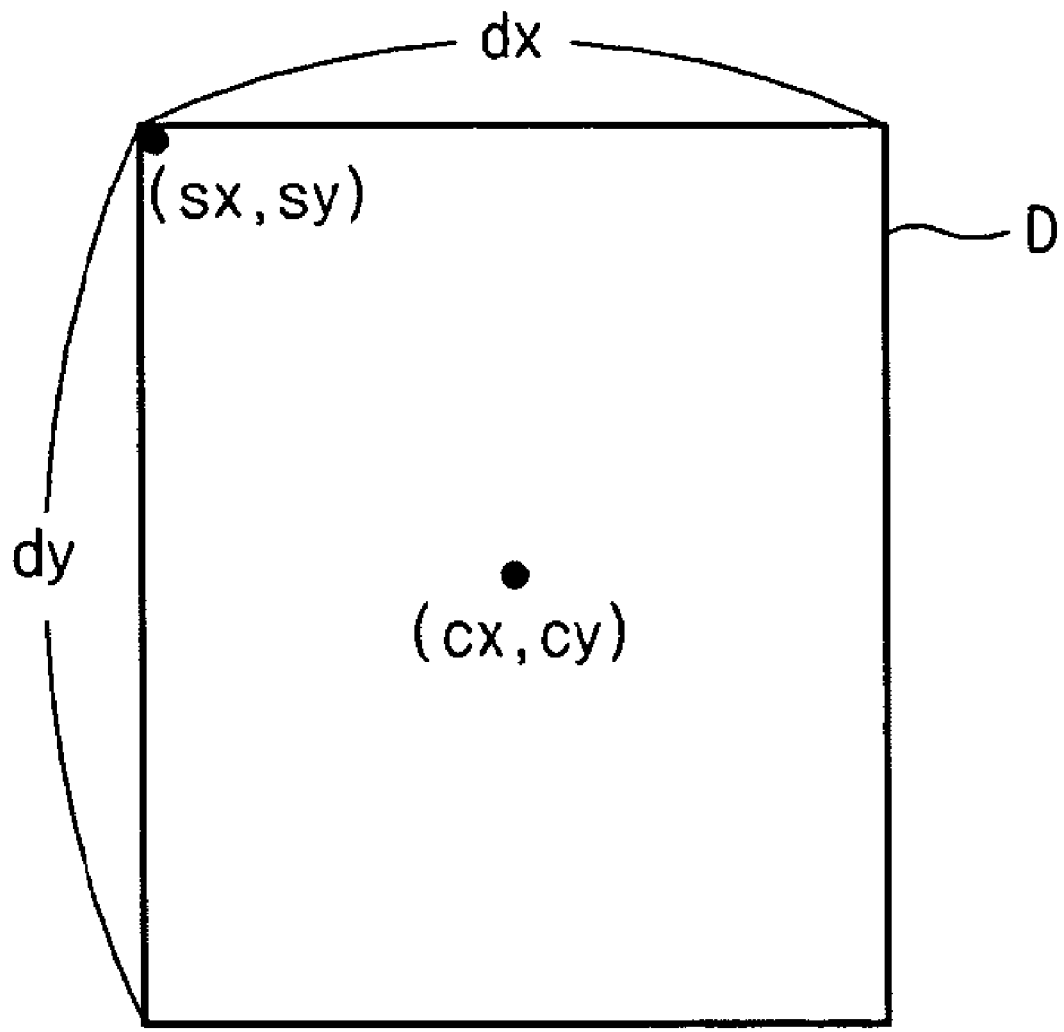
FIG. 3 is a diagram illustrating a center point and a start point according to an embodiment of the present invention.

The memory 20 stores data required to drive the display device as well as multimedia data, specifically image data stored by a user. In other words, the memory 20 stores the entire image data and size information dx and dy of a display area (see D of FIG. 3) displayed in a screen 50 from the entire image. As shown in FIG. 3, dx represents the length of a X (horizontal) direction of the display area, and dy represents the length of a Y (vertical) direction of the display area.

Figure 1:
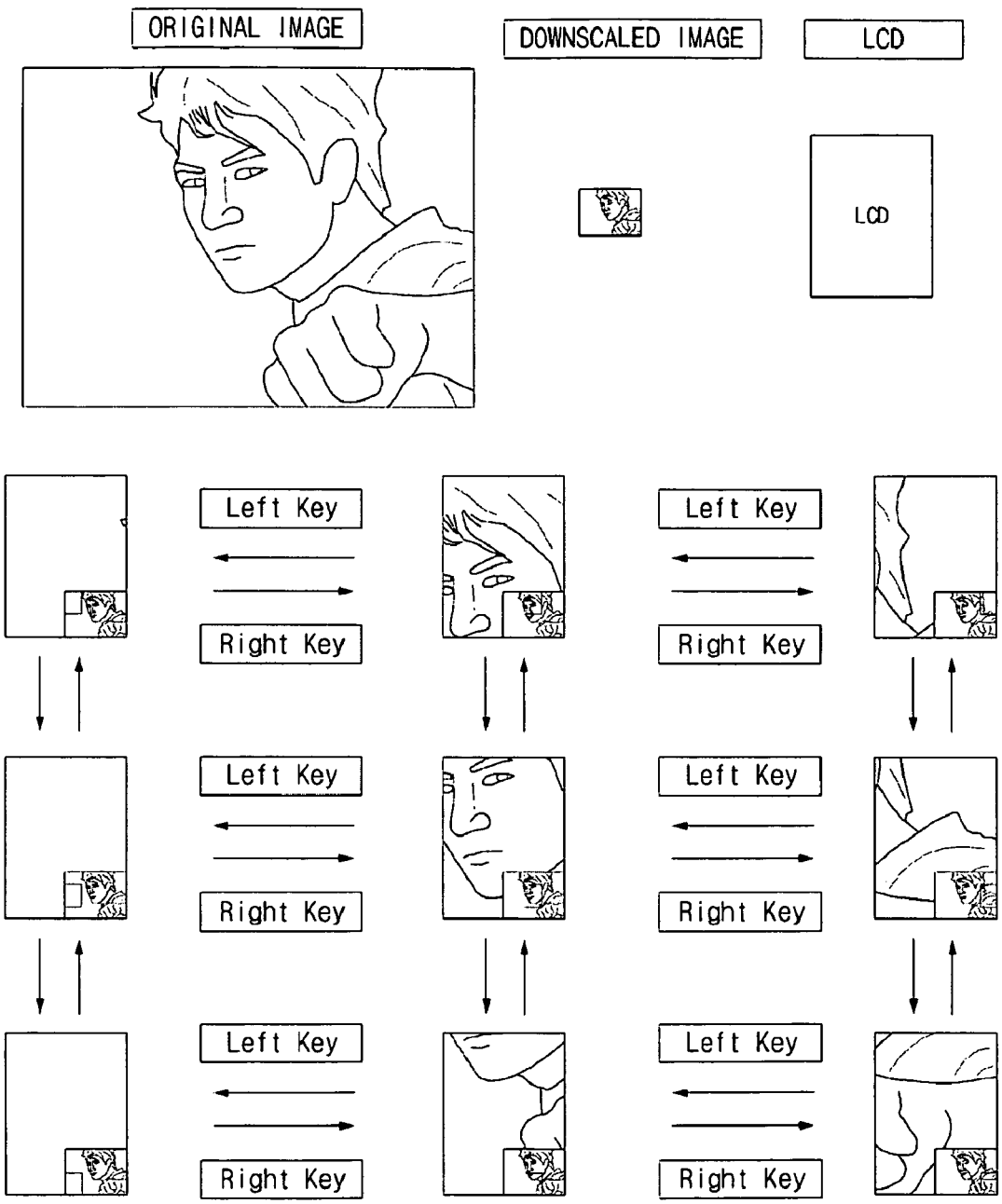
FIG. 1 is a diagram illustrating a detailed search process of an image stored in a general display device.

When a user moves a display area on the entire image size with the directional keys for detailed image search or swings a screen to change a state of the display area (change of aspect ratio), the location computing unit 30 computes a start point sx and sy of the changed display area with the size information dx and dy of the display area, change information mx and my of the area and image data. The location computing unit 30 searches a center point cx and cy of the changed display area with the change information of the display area, and reflects the size information dx and dy of the display area in the center point cx and cy to compute start point sx and sy. As shown in FIG. 1, when an image having a larger size than that of the display area is searched in detail, an initial center point of the display area is identical with center point X/2 and Y/2 of the entire image. In other words, the center point of the display area becomes cx=X/2, cy=Y/2 as an initial value of the detailed search. Since the movement distance mx and my into the X or Y direction depending on one handling the directional key is previously determined, the location computing unit 30 is capable of calculating a center point of the display area moved depending on the number of pressing of the directional keys. The location computing unit 30 adjusts (plus or minus) the movement distance into the X and Y directions corresponding to kinds of the directional keys and the pressed number of the directional keys from the initial center point cx and cy to calculate a center point of the moved display area. Thereafter, as shown in FIG. 3, the location computing unit 30 sets a point (pixel) of the left top of the display area as the start point sx and sy. The values of the start point sx and sy are represented by cx−dx/2 and cy−dy/2, respectively. Since the center point cx and cy is not changed even when the display area is swung to change the aspect ratio, the location computing unit 30 calculates values of dx and dy by exchanging them to obtain start point of the changed display area by the same process.

The display unit 40 transmits change information (movement distance information) of the display area to the location computing unit 30 when the display area is moved depending on using directional keys in the key-input unit 10. Next, the display unit 40 receives the start point (sx, sy) information from the location computing unit 30 to display image data corresponding to the size of display area into the X and Y directions based on the start point sx and sy. In other word, the display unit 40 decodes image data of the memory 20 corresponding to dx in the X direction and dy in the Y direction based on the start point sx and sy to display the decoded data in the screen 50. The display unit 40 also decodes image data corresponding to the size obtained by exchanging dx with dy when the display area is swung.

As a result, in the display device according to the embodiment of the present invention, the start point is obtained with the center point and the size information of the changed display area, and an changed display area from the entire image is determined based on the start point so that a current search location is maintained as it is even when the screen is swung.

Figure 4:
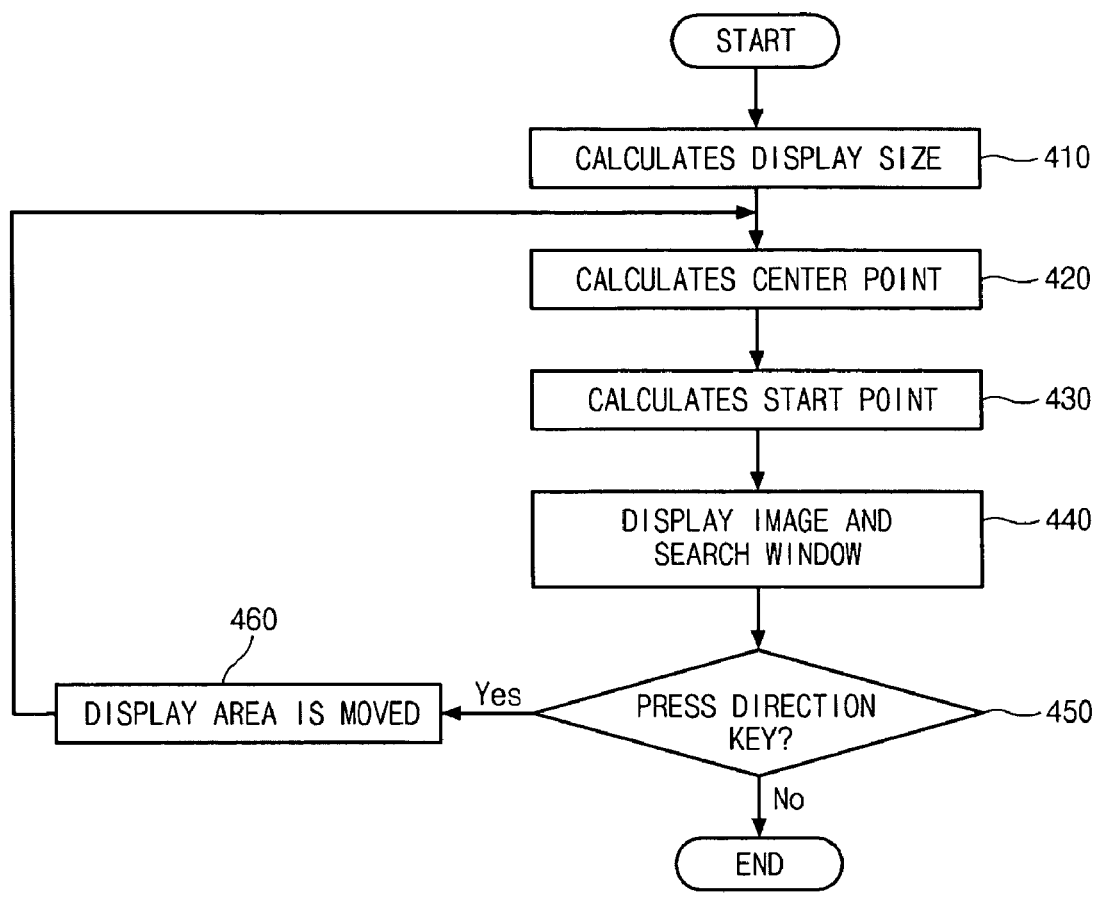
FIG. 4 is a flow chart illustrating a flexible display method depending on change of a display area according to an embodiment of the present invention.

FIG. 4 is a flow chart illustrating a flexible display method depending on change of a display area according to an embodiment of the present invention.

When an image to be searched is selected, an actual horizontal length X and an actual vertical length Y of the entire image are obtained in the display unit 40. Then, the display unit 40 calculates the display size to be displayed with the previously determined size information dx and dy of the display area (step 410).

The location computing unit 30 calculates center point of the display area (step 420). The initial values of the center point are identical with the values of the center point X/2, Y/2 of the original image.

Thereafter, the location computing unit 30 calculates the start point sx and sy (step 430). The start point sx and sy is a point apart from the center point by ½ (dx/2) of the horizontal length and ½ (dy/2) of the vertical length in the display area.

The calculated start point (sx, sy) information are transmitted into the display unit 40. The display unit 40 gets image data corresponding to the size information dx and dy of the display area from the memory 20 based on the start point sx and sy. The display unit 40 decodes the image data to display the data in the display area. As shown in FIG. 1, the display unit 40 displays a search window for showing where a currently displayed area is from the entire image in a predetermined region of the display area (step 440).

Figure 5:
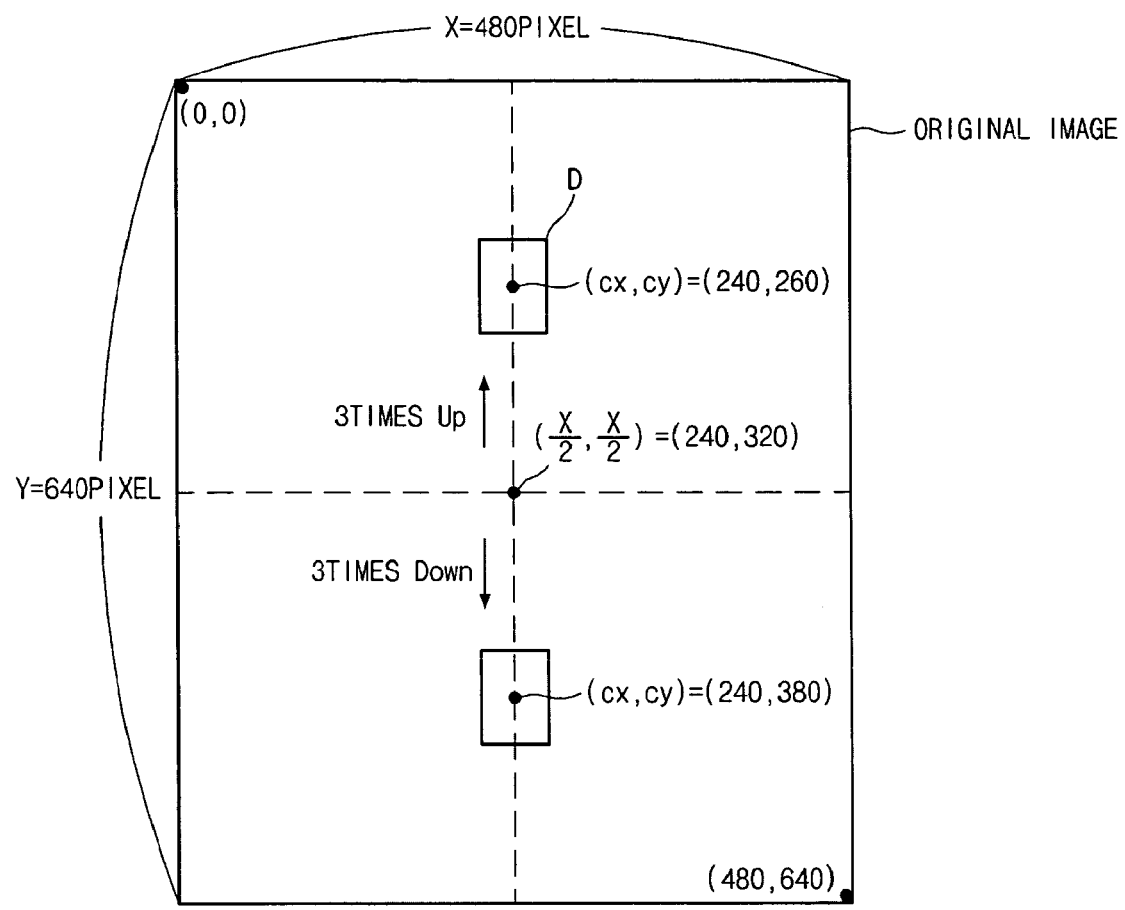
FIG. 5 is a diagram illustrating movement of a display area depending on top search and bottom search according to an embodiment of the present invention.

Next, when a user manipulates the directional keys for detailed search (or expanded search) (step 450), the display unit 40 moves the display area depending on the number of pressing of the directional keys and transmits the movement distance mx and my information to the location computing unit 30 (step 460). The location computing unit 30 re-calculates the center point of the moved display area with the movement distance mx and my and the initial center point information (step 420). That is, the location computing unit 30 adjusts the movement distance mx and my from the initial center point (cx=X/2, cy=Y/2) to re-obtain center point cx and cy of the moved display area. As shown in FIG. 5, when the size of the entire image is X=480 (pixel) and Y=640 (pixel) and the movement distance mx and my moved into the X and Y directions depending on one pressing of the directional keys is 20 (pixel) each, if a user presses a Up (↑) key three times for detailed search, the center point cx and cy of the display area D becomes 240 and 260. On the other hand, when a Down (↓) key is pressed three times, the center point cx and cy of the display area D becomes 240 and 380.

Then, the start point sx and sy is re-calculated with the new center point, and then is an image of a searched new area is displayed in the moved display area.

Figure 6:
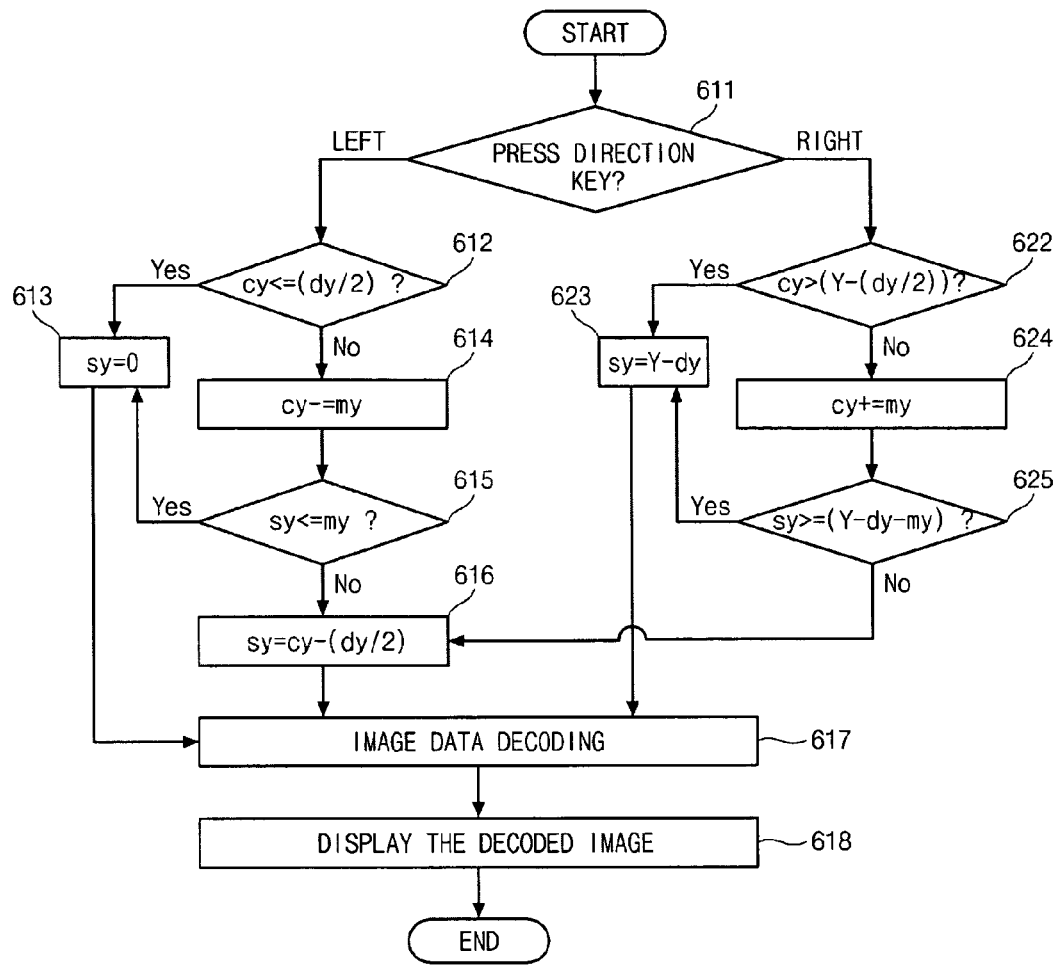
FIG. 6 is a flow chart illustrating a top search and a bottom search according to an embodiment of the present invention.

FIG. 6 is a flow chart illustrating a top search and a bottom search according to an embodiment of the present invention. FIG. 6 illustrates when the display area is moved only into the Y direction not into the X direction.

When a user presses a Up key for top search (step 611), the location computing unit 30 identifies whether the Y value cy of the current center point is smaller than or same as ½ (dy/2) of the vertical length of the display area (step 612).

That the Y value cy of the current center point is smaller than or the same as ½ (dy/2) of the vertical length of the display area means that the top area of the entire image has been already displayed in the display area. In other words, no more top search is required. As a result, the location computing unit 30 sets the Y value sy of the start point sx and sy as '0' when the Y value cy of the center point is smaller than or the same as ½ (dy/2) of the vertical length of the display area (step 613).

However, in the step 612, when the Y value cy of the center point is larger than ½ (dy/2) of the vertical length of the display area, the location computing unit 30 sets the Y value cy of the center point of the moved display area of FIG. 5 as a value obtained by subtracting the movement distance my into the Y direction from the previous Y value (step 614).

Thereafter, the location computing unit 30 identifies whether the Y value cy of the center point of the previous display area is smaller than or the same as the movement distance my (step 615).

That the Y value cy of the center point of the previous display area is smaller than or the same as the movement distance my means that the display area is not capable of moving upward. As a result, the location computing unit 30 sets the Y value sy of the start point sx and sy as '0' as shown in the step 613.

However, in the step 615, when the Y value cy of the center point is larger than the movement distance my, the location computing unit 30 sets a value obtained by subtracting ½ (dy/2) of the vertical length of the display area from the value calculated in the step 614 as a Y value of new start point (step 616). That is, the Y value cy of the new start point of the moved display area becomes cy−(dy/2). The information of the calculated start point sx and sy in the step 613 or 616 are transmitted into the display unit 40. The display unit 40 gets image data corresponding to the size information dx and dy of the display area from the memory 20 based on the start point sx and sy with the start point (sx, sy) information and the size information (dx, dy) of the display area and decodes the image data (step 617).

The display unit 40 displays the decoded data in the screen 50 so that an area to be searched in the entire image is displayed in the display area (step 618).

In the step 611, when a user presses a Down key for bottom search, the location computing unit 30 compares the Y value cy of the current center point with a value (Y−(dy/2) obtained by subtracting ½ (dy/2) of the vertical length of the display area from the vertical length Y of the entire image (step 622).

When the Y value cy of the center point is larger than or the same as Y−(dy/2), the bottom area of the entire image has been already displayed in the display area. That is, no more bottom search is required. In this case (cy>Y−(dy/2)), the location computing unit 30 sets the Y value sy of the start point sx and sy as 'Y−dy' (step 623).

However, in the step 622, when the Y value cy of the center point is smaller than Y−(dy/2), the location computing unit 30 sets a value obtained by adding the movement distance my into the Y direction to the previous Y value as the Y value cy of the center point of the is moved display area (step 624).

Then, the location computing unit 30 identifies whether the Y value cy of the start point of the previous display area is larger than or the same as Y−dy−my (step 625). In other words, that the Y value cy of the start point is larger than or the same as Y−dy−my means when no more display area moves downward. In this case, the location computing unit 30 sets the Y value cy of the start point as Y−dy as shown in the step 623. However, when the Y value cy of the start point is smaller than Y−dy−my, the location computing unit 30 sets the Y value cy of the start point as cy−(dy/2).

Figure 7:
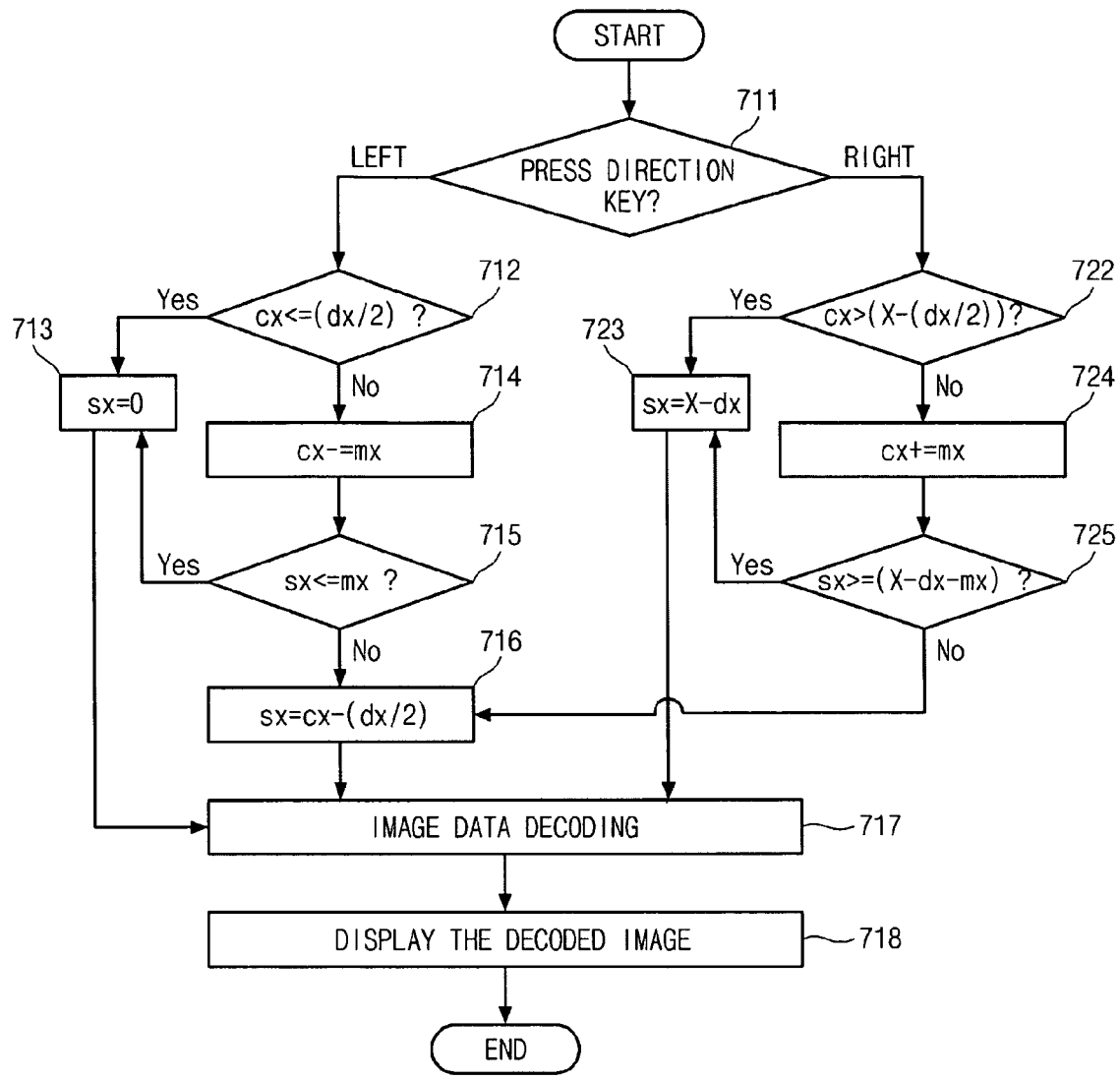
FIG. 7 is a flow chart illustrating a left search and a right search according to an embodiment of the present invention.

FIG. 7 is a flow chart illustrating a left search and a right search according to an embodiment of the present invention. FIG. 7 illustrates when the display area is moved only into the X direction not into the Y direction.

When a user presses a Left key for left search (step 711), the location computing unit 30 identifies whether the X value cx of the current center point is smaller than or same as ½ (dx/2) of the horizontal length of the display area (step 712).

That the X value cx of the current center point is smaller than or the same as ½ (dx/2) of the horizontal length of the display area means that the edge of the left area of the entire image is already displayed in the display area. In other words, no more left search is required. As a result, the location computing unit 30 sets the X value sx of the start point sx and sy as '0' when the X value cx of the center point is smaller than or the same as ½ (dx/2) of the horizontal length of the display area (step 713).

However, in the step 712, when the X value cx of the center point is larger than ½ (dx/2) of the horizontal length of the display area, the location computing unit 30 sets the X value cx of the center point of the moved display area as a value obtained by subtracting the is movement distance mx into the X direction from the previous X value (step 714).

Thereafter, the location computing unit 30 identifies whether the X value sx of the start point of the previous display area is smaller than or the same as the movement distance mx (step 715).

That the X value sx of the start point is smaller than or the same as the movement distance mx means that the display area cannot move further leftward. As a result, the location computing unit 30 sets the X value sx of the start point sx and sy as '0' as shown in the step 713.

However, in the step 715, when the X value sx of the start point is larger than the movement distance mx, the location computing unit 30 sets a value obtained by subtracting ½ (dx/2) of the horizontal length of the display area from the value calculated in the step 714 as a X value of new start point (step 716). That is, the X value sx of the new start point of the moved display area becomes cx−(dx/2).

The information of the calculated start point sx and sy in the step 713 or 716 are transmitted into the display unit 40. The display unit 40 gets image data corresponding to the size information dx and dy of the display area from the memory 20 based on the start points sx and sy with the start point (sx, sy) information and the size information (dx, dy) of the display area and decodes the image data (step 717).

The display unit 40 displays the decoded data in the screen 50 so that an area to be searched in the entire image is displayed in the display area (step 718).

In the step 711, when a user presses a Right key for right search, the location computing unit 30 compares the X value cx of the current center point with a value (X−(dx/2) obtained by subtracting ½ (dx/2) of the horizontal length of the display area from the horizontal length X of the entire image (step 722).

When the X value cx of the center point is larger than or the same as X−(dx/2), the edge of the right area of the entire image has been already displayed in the display area. That is, no more right search is required. In this case (cx>X−(dx/2)), the location computing unit 30 sets the X value sx of the start point sx and sy as 'X−dx' (step 723).

However, in the step 722, when the X value cx of the center point is smaller than X−(dx/2), the location computing unit 30 sets a value obtained by adding the movement distance mx into the X direction to the previous X value as the X value cx of the center point of the moved display area (step 724).

Then, the location computing unit 30 identifies whether the X value sx of the start point of the previous display area is larger than or the same as X−dx−mx (step 725). In other words, that the X value sx of the start point is larger than or the same as X−dx−mx means that the display area cannot move further rightward. In this case, the location computing unit 30 sets the X value sx of the start point as X−dx as shown in the step 723. However, when the X value sx of the start point is smaller than X−dx−mx, the location computing unit 30 sets the X value sx of the start point as cx−(dx/2).

Although a center point of the moved display area is first obtained and then the start point is calculated with the center point in this embodiment, other method can be performed.

That is, the start point is computed by different methods distinguished when the display area is moved upward, downward, leftward and rightward and when the display area is swung.

First, when the display area is moved by handling of the directional keys is exemplified.

The location computing unit 30 calculates a start point of the display area when an image is initially displayed on a screen. The start point is obtained by subtracting dx/2, dy/2 from the center point (cx=X/2, cy=Y/2). Then, when a directional key is manipulated, the location computing unit 30 adjusts the movement distance mx and my depending on a number of times that the directional keys are pressed, from the X value sx and the Y value sy of the initial start point to obtain a new start point of the changed display area.

However, the above-describe method cannot be applied to when the display area is swung. As a result, a new method is applied to when the display area is swung.

The size of the display area is fixed in the display device. Regardless of a location of the display area, the variation of the X and Y values from the start point before and after the display area is swung is constantly predetermined. The start point variation is previously calculated and stored in the memory 20. That is, the start point variation is a difference between coordinate values before and after the display area is swung based on the size of the display area. Then, when the display area is swung, the location computing unit 30 takes the start point variation from the memory depending on the swing direction and adjusts the start point variation from the start point before swing to obtain new start point after swing.

As described above, in a display device and method according to an embodiment of the present invention, a new start point is obtained with a center point of a changed display area and its size information, and then an area to be displayed is determined in the entire image based on the new start point. As a result, a current search location can be maintained as it is even when a screen is swung.

The foregoing description of various embodiments of the invention has been presented for purposes of illustration and description. It is not intended to be exhaustive or to is limit the invention to the precise form disclosed, and modifications and variations are possible in light of the above teachings or may be acquired from practice of the invention. Thus, the embodiments were chosen and described in order to explain the principles of the invention and its practical application to enable one skilled in the art to utilize the invention in various embodiments and with various modifications as are suited to the particular use contemplated.

What is claimed is:

1. A display device, comprising:
a memory to store an original multimedia data and size information of a display area;
a location computing unit to compute an initial start point of the display area, and to adjust a movement of the display area depending on a manipulation of user interface unit from the initial start point to calculate a start point of the moved display area when the display area is moved; and
a display unit to decode data corresponding to a size of the display area based on the start point of the moved display area from the original multimedia data and to display the decoded data,
wherein the location computing unit adjusts a start point variation from the initial start point before a display screen is swung to compute the start point of the moved display area when the display screen is swung.

2. The display device according to claim 1, wherein the start point variation is a difference between coordinate values before and after the display screen is swung based on the size of the display area.

3. The display device according to claim 1, wherein the location computing unit sets one of vertexes of the changed display area as the start point of the moved display area.

4. The display device according to claim 1, wherein the display unit displays a search window to show a location of a currently displayed area from the original multimedia data in a predetermined region of the display area.

5. A method for displaying an image on a display area, comprising:
computing a first start point of the display area from an original multimedia data when the image is displayed on a screen of a display device;
computing a second start point of a moved display area depending on a manipulation of user interface unit; and
displaying an area corresponding to a size of the moved display area based on the second start point of the moved display area from the original multimedia data,
wherein computing the second start point further comprises adjusting a movement of the display area from the first start point of the display area before the display screen is swung, and to adjust a start point variation from the first start point of the display area to compute the second start point of the moved display area when the display screen is swung.

6. The method according to claim 5, wherein the step of displaying the area comprises decoding image data of an area corresponding to a horizontal length of the display area in a X direction and a vertical length of the display area in a Y direction based on the second start point of the moved display area to display the decoded image data.

7. The method according to claim 5, wherein the start point variation is a difference between coordinate values before and after the display screen is swung based on the size of the display area.

8. The method according to claim 5, wherein the second start point corresponds to one of vertexes of the display area.

9. A display device, comprising:
a memory to store an original multimedia data and size information of a display area displayed on a display screen when a part from the original multimedia data is enlarged;
a user interface unit to search the part by enlargement and movement; a location computing unit to set a start point of the display area from the original multimedia data;
a display unit to decode data based on the start point corresponding to the size of the display area obtained by exchanging a horizontal length value with a vertical length value of the display area when the display screen is swung.

10. The display device according to claim 9, wherein the memory further comprises start point variation which is a difference between coordinate values of the start point before and after the display area is swung.

11. The display device according to claim 10, wherein the location computing unit adjusts the start point variation when the display area is swung.

12. The display device according to claim 9, wherein the location computing unit sets one of vertexes of the display area as the start point.

13. The display device according to claim 9, wherein the display unit displays a search window for showing a location of a currently displayed area from the original multimedia data in a predetermined region of the display area.

14. A method for displaying an image on a display area, comprising:
storing an original multimedia data; storing size information of the display area displayed on a screen of a display device when a user enlarges a desired part from the original multimedia data by manipulating user interface unit;
setting a start point of the display area from the original multimedia data; and displaying an area based on the start point corresponding to a size obtained by exchanging a horizontal length value with a vertical length value of the display area when a display screen is swung.

15. The method according to claim 14, wherein the start point corresponds to one of vertexes of the display area.

16. A method for displaying enlarged multimedia data on a display screen, comprising:

storing an original multimedia data having a width X and a length Y;

selecting a first area of the original multimedia data, the first area having a width dx and a length dy, wherein dx is less than X and dy is less than Y;

displaying the first area corresponding to a size of the display screen of the display device;

selecting a second area of the original multimedia data, the second area having a width dy and a length dx when the display screen is swung, wherein dy is less than X and dx is less than Y;

displaying the second area corresponding to a size of the display screen of the display device when the display screen is swung, wherein the first area and the second area at least partially overlap.

17. The method according to claim 16, wherein the second area has a start point based on one of vertexes of the first area.

* * * * *